United States Patent
Ramabhadran et al.

(10) Patent No.: US 12,087,279 B2
(45) Date of Patent: Sep. 10, 2024

(54) REGULARIZING WORD SEGMENTATION

(71) Applicant: Google LLC, Mountain View, CA (US)

(72) Inventors: Bhuvana Ramabhadran, Mt. Kisco, NY (US); Hainan Xu, Mountain View, CA (US); Kartik Audhkhasi, Mountain View, CA (US); Yinghui Huang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 17/656,225

(22) Filed: Mar. 23, 2022

(65) Prior Publication Data

US 2022/0310061 A1   Sep. 29, 2022

Related U.S. Application Data

(60) Provisional application No. 63/166,958, filed on Mar. 26, 2021.

(51) Int. Cl.
| | |
|---|---|
| *G10L 15/02* | (2006.01) |
| *G06F 40/284* | (2020.01) |
| *G06N 3/04* | (2023.01) |
| *G10L 15/04* | (2013.01) |
| *G10L 15/06* | (2013.01) |
| *G10L 15/16* | (2006.01) |
| *G10L 25/30* | (2013.01) |

(52) U.S. Cl.
CPC ............ *G10L 15/04* (2013.01); *G06F 40/284* (2020.01); *G06N 3/04* (2013.01); *G10L 15/063* (2013.01); *G10L 15/16* (2013.01); *G10L 25/30* (2013.01); *G10L 15/02* (2013.01)

(58) Field of Classification Search
None
See application file for complete search history.

(56) References Cited

U.S. PATENT DOCUMENTS

| | | | |
|---|---|---|---|
| 2020/0265196 | A1 | 8/2020 | Ravi et al. |
| 2021/0141798 | A1* | 5/2021 | Steedman Henderson ................... G06F 16/3344 |
| 2022/0238101 | A1* | 7/2022 | Sainath ................... G10L 15/16 |

OTHER PUBLICATIONS

Jennifer fox Drexler, "Improving End-to-End Neural Network Models for Low-Resource Automatic Speech Recognition," Sep. 2020, available at: https://dspace.mit.edu/bitstream/handle/1721.1/129248/1227518442-MIT.pdf?sequence=1 (Year: 2020).*

(Continued)

*Primary Examiner* — Bhavesh M Mehta
*Assistant Examiner* — Jean D. Aristilde
(74) *Attorney, Agent, or Firm* — Honigman LLP; Brett A. Krueger; Grant Griffith

(57) ABSTRACT

A method for subword segmentation includes receiving an input word to be segmented into a plurality of subword units. The method also includes executing a subword segmentation routine to segment the input word into a plurality of subword units by accessing a trained vocabulary set of subword units and selecting the plurality of subword units from the input word by greedily finding a longest subword unit from the input word that is present in the trained vocabulary set until an end of the input word is reached.

18 Claims, 8 Drawing Sheets

(56) References Cited

OTHER PUBLICATIONS

Peter Ingels, "A Robust Text Processing Technique applied to Lexical Error Recovery," Feb. 5, 1997, arXiv:cmp-1g/9702003v1, available at: "https://arxiv.org/abs/cmp-lg/9702003" (Year: 1997).*

Drexler, "Improving End-to-End Neural Network Models for Low-Resource Automatic Speech Recognition," Sep. 2020, available at: "https://dspace.mit.edu/bitstream/handle/1721.1/129248/1227518442-MIT.pdf?sequence=1" (Year: 2020).*

Graham Neubig "Neural Machine Translation and Sequence-to-Sequence Models," Mar. 5, 2017, arXiv:1703.01619v1, available at:"https://arxiv.org/pdf/1703.01619" (Year: 2017).*

May 25, 2022 Written Opinion (WO) of the International Searching Authority (ISA) and International Search Report (ISR) issued in International Application No. PCT/US2022/021621.

Xu Hainan et al: "Regularizing Word Segmentation by Creating Misspellings", Interspeech 2021, Aug. 30, 2021 (Aug. 30, 2021), pp. 2561-2565, XP055920675, ISCA DOI: 10.21437/Interspeech. 2021-648 Retrieved from the Internet: URL:<https://www.isca>-speech.org/archive/pd <http://speech.org/archive/pd> fs/interspeech_2021/ku21f_interspeech.pdf.

Mike Schuster et al: "Japanese and Korean voice search",2012 IEEE International Conference On Acoustics, Speech and Signal Processing (ICASSP 2012): Kyoto, Japan, Mar. 25-30, 2012 ; [Proceedings], IEEE, Piscataway, NJ, Mar. 25, 2012 (Mar. 25, 2012), pp. 5149-5152, XP032228315, DOI: 10.1109/ICASSP.2012. 6289079 ISBN:978-1-4673-0045-2.

Felix Stahlberg: "Neural Machine Translation: A Review and Survey", ARXIV.ORG <http://ARXIV.ORG>, Cornell University Library, 201 Olin Library Cornell University Ithaca, NY 14853, Sep. 29, 2020 (Sep. 29, 2020), XP081774929.

Egor Lakomkin et al: "Subword Regularization: An Analysis of Scalability and Generalization for End-to-End Automatic Speech Recognition", ARXIV.ORG <http://ARXIV.ORG>, Cornell University Library, 201 Olin Library Cornell University Ithaca, NY 14853, Aug. 10, 2020 (Aug. 10, 2020), XP081736117.

Kiao Zhangyu et al.:"Hybrid CTC—Attention based End-to-End Speech Recognition using Subword Units",2018 11th International Symposium On Chinese Spoken Language Processing (Iscslp), IEEE, Nov. 26, 2018 (Nov. 26, 2018), pp. 146-150, P033545257,DOI: 10.1109/ISCSLP.2018.8706675.

* cited by examiner

400

```
Input: vocabulary M, an input word w
Output: subword segmentation of w
1  ans = [];
2  i = 0;
3  while i < len(w) do
4  |    sub = longest subword of w starting at index i that
   |       exists in V;
5  |    i = i + len(sub);
6  |    ans.append(sub);
7  end
8  return ans;
```

FIG. 4

REGULARIZING WORD SEGMENTATION

CROSS REFERENCE TO RELATED APPLICATIONS

This U.S. patent application claims priority under 35 U.S.C. § 119(e) to U.S. Provisional Application 63/166,958, filed on Mar. 26, 2021 The disclosure of this prior application is considered part of the disclosure of this application and is hereby incorporated by reference in its entirety.

TECHNICAL FIELD

This disclosure relates to regularizing word segmentation.

BACKGROUND

Automated speech recognition (ASR) systems have evolved from multiple models (e.g., acoustic, pronunciation, and language models) where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words or graphemes when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

SUMMARY

One aspect of the disclosure provides a computer-implemented method for subword segmentation. The computer-implemented method when executed on data processing hardware causes the data processing hardware to perform operations that include receiving an input word to be segmented into a plurality of subword units. The operations also include executing a subword segmentation routine to segment the input word into a plurality of subword units by accessing a trained vocabulary set of subword units and selecting the plurality of subword units from the input word by greedily finding a longest subword unit from the input word that is present in the trained vocabulary set until an end of the input word is reached.

Implementations of the disclosure may include one or more of the following optional features. In some implementations, selecting the plurality of subword units includes, for each corresponding position of a plurality different positions of the input word: identifying all possible candidate subword units from the input word at the corresponding position that are present in the trained vocabulary set; and randomly sampling from all of the possible candidate subword units by assigning a 1−p probability to a longest one the possible candidate subword units and dividing a rest of the p probability evenly among all of the possible candidate subword units from the input word at the corresponding position. The operations may further include, prior to executing the subword segmentation model, creating a misspelling to the input word by randomly deleting, using a pre-specified probability, a character from the input word independently.

In some examples, the operations also include, prior to executing the subword segmentation model, creating a misspelling to the input word by pre-specifying a probability for swapping an order of adjacent character-pairs, and for each adjacent character-pair in the input word, swapping the order of the characters from the adjacent character-pair in the input word based on the pre-specified probability. Here, the order of any given character in the input word is limited to at most one swap.

In some implementations, the operations also include receiving a training example comprising audio data characterizing an utterance of the input word and processing the audio data to generate, for output by a speech recognition model, a speech recognition result for the utterance of the input word. Here, the speech recognition result includes a sequence of hypothesized sub-word units each output from the speech recognition model at a corresponding output step. In these implementations, the operations further include determining a supervised loss term based on the sequence of hypothesized sub-word units and the plurality of subword units selected from the input word by the subword segmentation routine and updating parameters of the speech recognition model based on the supervised loss term. In some examples, the speech recognition model includes a Recurrent Neural Network-Transducer (RNN-T) model architecture having an audio encoder, a prediction network, and a joint network. Here, the audio encoder may include one of a plurality of long-short term memory (LSTM) layers, a plurality of transformer layers, or a plurality of conformer layers. In other examples, the speech recognition model includes a Listen, Attend, Spell (LAS) model architecture having an audio encoder, an attention mechanism, and a decoder.

Another aspect of the disclosure provides a system for subword segmentation that includes data processing hardware and memory hardware in communication with the data processing hardware. The memory hardware stores instructions that when executed on the data processing hardware causes the data processing hardware to perform operations that include receiving an input word to be segmented into a plurality of subword units. The operations also include executing a subword segmentation routine to segment the input word into a plurality of subword units by accessing a trained vocabulary set of subword units and selecting the plurality of subword units from the input word by greedily finding a longest subword unit from the input word that is present in the trained vocabulary set until an end of the input word is reached.

Implementations of the disclosure may include one or more of the following optional features. In some implementations, selecting the plurality of subword units includes, for each corresponding position of a plurality different positions of the input word: identifying all possible candidate subword units from the input word at the corresponding position that are present in the trained vocabulary set; and randomly sampling from all of the possible candidate subword units by assigning a 1−p probability to a longest one the possible candidate subword units and dividing a rest of the p probability evenly among all of the possible candidate subword units from the input word at the corresponding position. The operations may further include, prior to executing the subword segmentation model, creating a misspelling to the input word by randomly deleting, using a pre-specified probability, a character from the input word independently.

In some examples, the operations also include, prior to executing the subword segmentation model, creating a misspelling to the input word by pre-specifying a probability for swapping an order of adjacent character-pairs, and for each adjacent character-pair in the input word, swapping the order of the characters from the adjacent character-pair in the input word based on the pre-specified probability. Here, the order of any given character in the input word is limited to at most one swap.

In some implementations, the operations also include receiving a training example comprising audio data characterizing an utterance of the input word and processing the audio data to generate, for output by a speech recognition model, a speech recognition result for the utterance of the input word. Here, the speech recognition result includes a sequence of hypothesized sub-word units each output from the speech recognition model at a corresponding output step. In these implementations, the operations further include determining a supervised loss term based on the sequence of hypothesized sub-word units and the plurality of subword units selected from the input word by the subword segmentation routine and updating parameters of the speech recognition model based on the supervised loss term. In some examples, the speech recognition model includes a Recurrent Neural Network-Transducer (RNN-T) model architecture having an audio encoder, a prediction network, and a joint network. Here, the audio encoder may include one of a plurality of long-short term memory (LSTM) layers, a plurality of transformer layers, or a plurality of conformer layers. In other examples, the speech recognition model includes a Listen, Attend, Spell (LAS) model architecture having an audio encoder, an attention mechanism, and a decoder.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is an example algorithm representing the subword segmentation routine of FIG. 3.

Like reference symbols in the various drawings indicate like elements.

DETAILED DESCRIPTION

Figure 1:
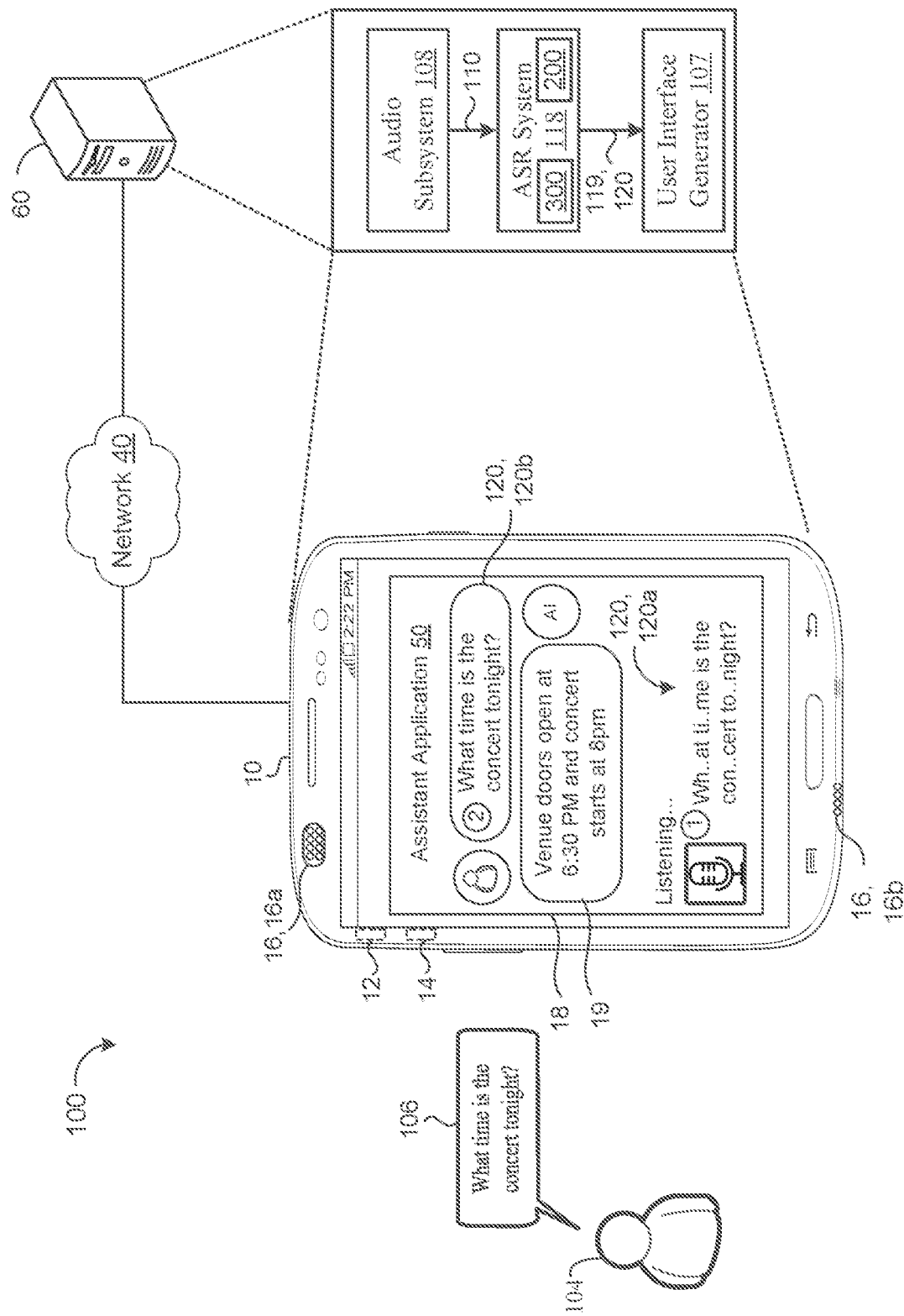
FIG. 1 is a schematic view of an example system for subword segmentation for training a speech recognition model.

Modern automated speech recognition (ASR) systems focus on providing not only high quality (e.g., a low word error rate (WER)), but also low latency (e.g., a short delay between the user speaking and a transcription appearing). The development of end-to-end sequence ASR models provides a single neural network model to directly receive audio representing speech as input and output recognized text, without the use of distinct and separately trained acoustic, language, and pronunciation models. With end-to-end sequence ASR models, word-based and grapheme-based representations of text are two straightforward techniques for representing the output recognized text. Generally, word-based representations result in text sequences having shorter lengths compared to grapheme-based representations, making it easier for the ASR model to learn dependencies across context. However, implementing ASR models to use word-based representations require a pre-defined vocabulary for recognizing possible words, thereby restricting the ability to handle out-of-vocabulary (OOV) terms/words that were not present in training data. Another drawback of word-based representations is that without incorporating additional information into generated word embeddings, the ASR model is unable to learn relationships between linguistically-related words, e.g., "catch" versus "catching", "book" versus "books", "help" versus "helpful", etc.

Grapheme-based representations on the other hand, include the output of sequences of single characters that form the words. While ASR models using grapheme-based representations can theoretically learn relations between similarly spelled words and handle OOV terms/words, a major drawback is the need for larger memory footprints and computational times required to generate the much longer text sequences. Stated differently, producing grapheme-based representations increases a number of decoding steps that has the inverse effect of reducing inference speeds. Moreover, grapheme-based representations inhibit the ability to learn patterns from data, resulting in non-optimal performance.

Implementations herein are directed toward using an end-to-end sequence ASR model that directly maps input audio data (i.e., input sequence) to an output sequence in the form of a subword-based text representation that includes a sequence of subword units that form one or more words. Subword-based text representations achieve a trade-off between the two approaches of word-based representations and grapheme-based representations. Implementations herein are more specifically directed toward a subword segmentation routine (also referred to as a "word tokenization routine/algorithm" or simply "wordpiece model") that improves the subword-based representation of text for training sequence ASR models. As will be discussed in greater detail below, executing the subword segmentation routine segments an input word into a plurality of subword units by accessing a trained vocabulary set of subword units and sequentially selecting subword units for inclusion in the plurality of subword units by greedily finding a longest subword unit from the input word that is present in the trained vocabulary set until an end of the input word is reached. As used herein, the term "subword units" may be interchangeably referred to as "wordpieces" and may range from graphemes all the way up to entire words. Notably, a vocabulary set of subword units accessed by the subword segmentation routine does not need to include any OOV terms/words, requiring the subword segmentation routine to be trained to only maximize a language model likelihood over a training set of input words. The subword segmentation routine may correlate to a statistical wordpiece model trained with word counts obtained from text data for segmenting each input word individually into subword units. A symbol denoting an individual space may be included in subword units.

The input word may include one of one or more words in a ground-truth transcription of a training utterance characterized by training audio data. As such, the plurality of subword units segmented from the input word and selected by subword segmentation routine may serve as ground-truth subword units for use in training an ASR model to learn to predict an output sequence of subword units from the input training audio data characterizing the training utterance. The audio data characterizing the training utterance may include a non-synthesized speech representation corresponding to a human speaking the training utterance or a synthesized speech representation converted from input text (e.g., the ground-truth transcription) by a text-to-speech.

Additional implementations are directed toward applying one or more regularization techniques to the input word prior to segmentation by the subword segmentation routine. Discussed in greater detail below, these regularization techniques may include altering the spelling of input words before executing the subword segmentation routine to thereby provide a sophisticated form of label smoothing for improving the performance of the ASR model.

FIG. 1 is an example an example system 100 for a speech environment. In the speech environment, a user's 104 manner of interacting with a computing device, such as a user device 10, may be through voice input. The user device 10 (also referred to generally as a device 10) is configured to capture sounds (e.g., streaming audio data) from one or more users 104 within the speech environment. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches, smart headphones, headsets, etc.), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment into electrical signals and a speech output device (e.g., a speaker) 16, 16b for communicating an audible audio signal (e.g., as output audio data from the device 10). While the user device 10 implements a single audio capture device 16a in the example shown, the user 1s device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 118 implementing an end-to-end sequence ASR model 200 that is trained to directly map input audio data 110 corresponding to an utterance 106 to a subword-based text representation 119 that includes a sequence of subword units 119 forming words in a transcription 120 of the utterance 106. The ASR system 118 executes a subword segmentation routine 300 (also referred to as a "word tokenization routine/algorithm" or simply "wordpiece model") that improves the subword-based text representation 119 for training the sequence ASR model 200. Discussed in greater detail below with reference to FIG. 3, the ASR system 118 executes subword segmentation routine 300 to segment an input word 302 (FIG. 3) into a plurality of subword units 119 for use in improving speech recognition accuracy of the ASR model 200 trained to predict output labels in the form of subword-based text representations 119.

Notably, the subword units 119 segmented by the subword segmentation routine 300 better reflect human speech with accents, varied pronunciations, and/or disfluencies. As such, the subword segmentation routine 300 complements multilingual ASR models 200 capable of recognizing speech spoken in different languages. For instance, the multilingual ASR model 200 may be trained to recognize speech from multilingual speakers, such as speakers that code-switch between different Indic languages, whereby the subword units 119 segmented by the subword segmentation routine 300 improve performance on the ASR model 200 when these multilingual speakers toggle between languages and change pronunciation of words and their neighboring words. By the same notion, subword units 119 segmented by the subword segmentation routine 300 may enable an ASR model 200 (monolingual or multilingual) to be inclusive of recognizing all types of atypical/accented speech that may be spoken by different speakers.

The ASR system 118 may reside on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames (e.g., audio data) 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the ASR model 200 receives, as input, the audio data 110 corresponding to the utterance 106, and generates/predicts, as output at each of a plurality of output steps, a corresponding to sub-word unit to form a transcription 120 (e.g., recognition result/hypothesis) of the utterance 106. In the example shown, the ASR model 200 may perform streaming speech recognition to produce an initial speech recognition result 120 that may be rescored to produce a final speech recognition result 120.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120 in a streaming fashion and subsequently display the final speech recognition result 120. In some configurations, the transcription 120 output from the ASR system 118 is processed, e.g., by a natural language understanding (NLU)

module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

In the example shown in FIG. 1, the digital assistant application 50 may respond to the question posed by the user 104 using natural language processing. Natural language processing generally refers to a process of interpreting written language (e.g., the initial speech recognition results 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2A:
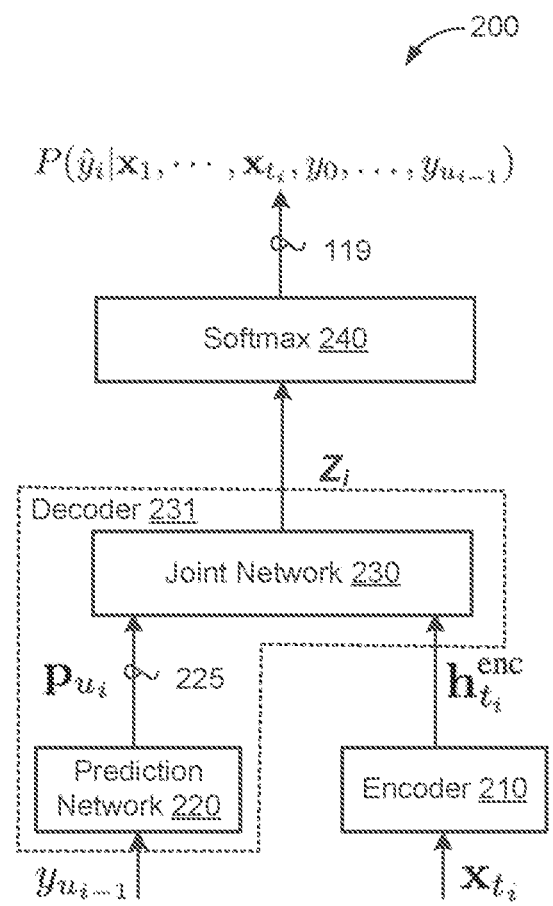
FIG. 2A is a schematic view of an example Recurrent Neural Network-Transducer (RNN-T) model architecture.

Referring to FIG. 2A, in some implementations, the ASR model 200 includes a Recurrent Neural Network-Transducer (RNN-T) model 200a architecture (or other type of frame alignment-based transducer model) which adheres to latency constraints associated with interactive applications. The RNN-T model 200a provides a small computational footprint and utilizes less memory requirements than conventional ASR architectures, making the RNN-T model architecture suitable for performing speech recognition entirely on the user device 102 (e.g., no communication with a remote server is required). The RNN-T model 200a includes an encoder network 210, a prediction network 220, and a joint network 230. The prediction and joint networks 220, 230 may collectively provide an RNN-T decoder 231. The encoder network 210, which is roughly analogous to an acoustic model (AM) in a traditional ASR system, may include a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank subword units output by a final Softmax layer 240 so far, $y_0, \ldots, y_{ui-1}$, into a representation $p_{u_i}$ 225. Notably, the sequence of non-blank subword units $(y_0, \ldots, y_{ui-1})$ received at the prediction network 220 capture linguistic dependencies between non-blank symbols predicted during the previous time steps so far to assist the joint network 230 in predicting the probability of a next output subword unit 219 or blank symbol during the current time step.

Finally, with the RNN-T model architecture, the representations produced by the encoder and prediction networks 210, 220 are combined by the joint network 230. The joint network then predicts $Z_i = P(y_i | x_{t_i}, y_0, \ldots, y_{u_{i-1}})$, which is a distribution over the next subword unit 119. Stated differently, the joint network 230 generates, at each output step (e.g., time step), a probability distribution over hypothesized subword units 119. Here, the "hypothesized subword units" correspond to possible subword units from a trained vocabulary set 350 (FIG. 3) of subword units each representing a corresponding subword unit in a specified natural language. The subword units within the vocabulary set 350 ranges from individual graphemes, wordpieces, and whole words. In some examples, the trained vocabulary set 350 includes 4,096 different subword units in a specified natural language. In these examples, the joint network 230 is trained to predict/output 4,096 different subword units. The output distribution of the joint network 230 can include a posterior probability value for each of the different hypothesized subword units. Thus, if there are 4,096 different subword units representing different graphemes, wordpieces, or words, the output $y_i$ of the joint network 230 can include 4,096 different probability values, one for each output label. The probability distribution can then be used to select and assign scores to candidate subword units (e.g., graphemes, wordpieces, and/or words) in a beam search process (e.g., by the Softmax layer 240) for determining the transcription 120.

The Softmax layer 240 may employ any technique to select the output subword unit with the highest probability in the distribution as the next subword unit predicted by the RNN-T model 200a at the corresponding output step. In this manner, the RNN-T model 200a does not make a conditional independence assumption, rather the prediction of each subword unit is conditioned not only on the acoustics but also on the sequence of subword units output so far. The RNN-T model 200a does assume an output subword unit is independent of future acoustic frames 110, which allows the RNN-T model to be employed in a streaming fashion.

In some examples, the encoder network 210 of the RNN-T model 200 is made up of eight 2,048-dimensional LSTM layers, each followed by a 640-dimensional projection layer. In other implementations, the encoder network 210 includes a network of conformer or transformer layers. The prediction network 220 may have two 2,048-dimensional LSTM layers, each of which is also followed by 640-dimensional projection layer as well as an embedding layer of 128 units. Finally, the joint network 230 may also have 640 hidden units. The Softmax layer 240 may be composed of a unified wordpiece/subword unit set that is generated using all unique wordpieces/subword units in training data.

Figure 2B:
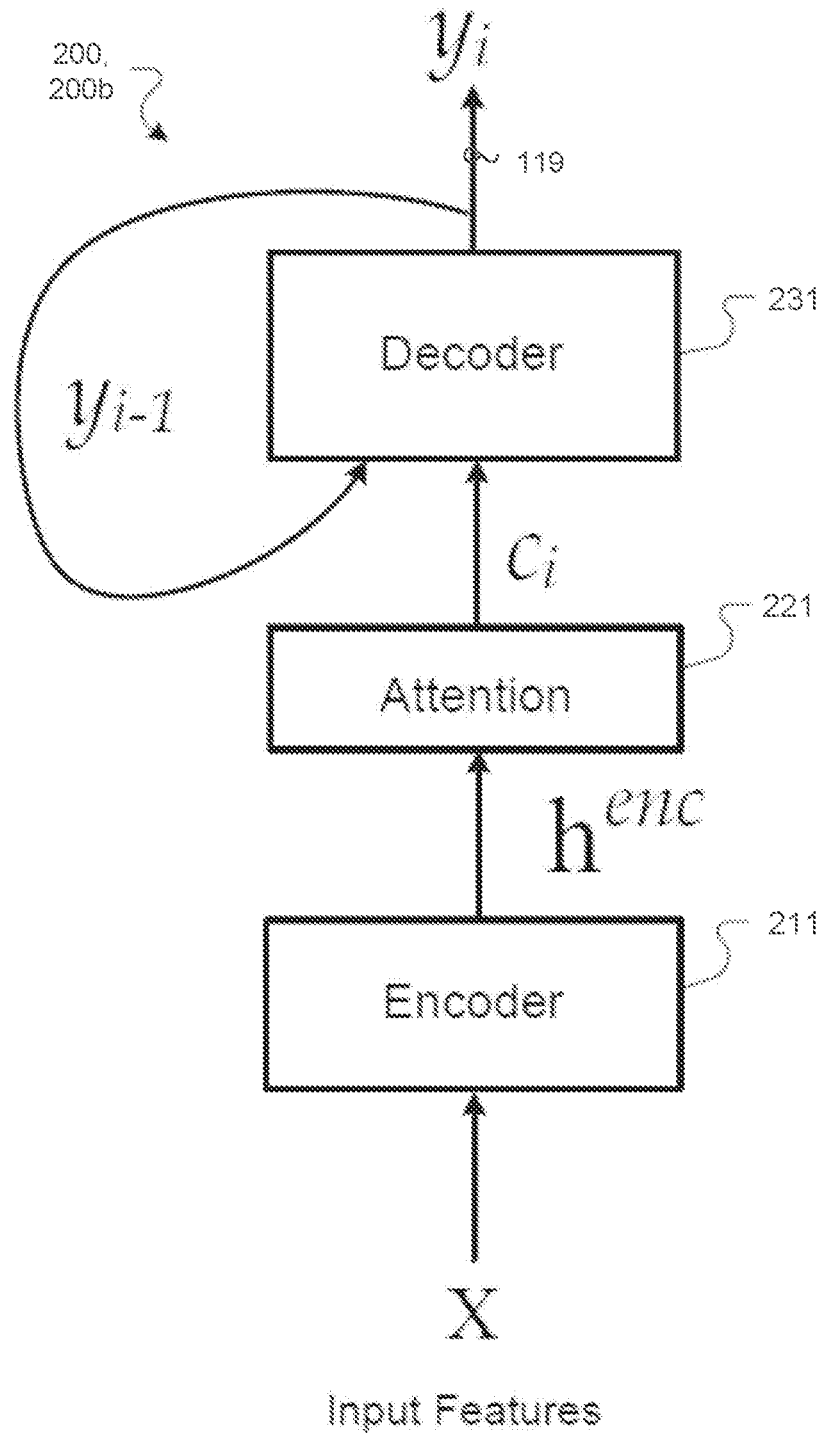
FIG. 2B is a schematic view of an example Listen, Attend, and Speel model architecture.

Referring to FIG. 2B, in other implementations, the ASR model 200 includes a Listen, Attend and Spell (LAS) model 200b architecture that provides a single neural network including a listener encoder module 211 which is analogous to a conventional acoustic model, an attender module 221 that acts as an alignment model, and a decoder 231 that is analogous to the language model in a conventional system. Specifically, the listener encoder module 211 takes the input features (e.g., acoustic frames 110 (FIG. 1)), x, and maps them to a higher-level feature representation, $h^{enc}$. This process of generating an encoded feature representation, $h^{enc}$, can be done for each of the multiple input frames, representing different input time steps. These timesteps are denoted with a subscript u below. Thus, for a set of frames $\{f_1, f_2, f_3, \ldots f_u\}$ there can be a corresponding set of encoded outputs $\{h_1, h_2, h_3, \ldots h_u\}$.

The output of the listener encoder module 211 is passed to the attender module 221, which determines which encoder features in $h^{enc}$ should be attended to in order to predict the next output subword unit, $y_i$, similar to a dynamic time warping (DTW) alignment module. In some examples, the attender module 221 is referred to herein as attender neural network or attender 221. The attender 221 can generate a context output $c_i$ for each of multiple output steps i. For each context output vector $c_i$, the attender 221 can compute attention based on the encodings for one or more input steps u, e.g., the encoding for the current input step as well as encodings for previous input steps. For example, the attender 221 can generate an attention context output $c_i$ over the set of all the encoder outputs of the utterance, e.g., the entire set $\{h_1, h_2, h_3, \ldots h_u\}$. The attention context vector can be a vector representing a weighted summary of the current and previous encodings for frames (e.g., portions) of the utterance being recognized.

Finally, the output of the attender 221 is passed to the decoder 231, which takes the attention context (e.g., a context vector or attention distribution), $c_i$, output by the attender 221, as well as an embedding of the previous prediction, $y_i-1$, in order to produce a decoder output. The decoder output can be a probability distribution, $P(y_i|y_{i-1}, \ldots, y_0, x)$, over the current hypothesized subword unit, $y_i$, given the hypothesized subword units, $\{y_{i-1}, \ldots, y_0\}$, and input, x. Accordingly, the decoder 231 generates, at each output step, a probability distribution over hypothesized subword units 119. As with the RNN-T model 200a discussed above with reference to FIG. 2A, the "hypothesized subword units" correspond to possible subword units from the trained vocabulary set 350 (FIG. 3) of subword units each representing a corresponding subword unit in a specified natural language.

Although not illustrated, the LAS model 200b may include a softmax layer that receives output of the decoder 231. In some implementations, the softmax layer is separate from the decoder 231 and processes the output, $y_i$, from the decoder 231, and the output of the softmax layer is then used in a beam search process to select subword units that form words of the resulting transcription 120. In some implementations, the softmax layer is integrated with the decoder 231, so that the output $y_i$ of the decoder 231 represents the output of the softmax layer.

The decoder 231 and/or an associated softmax layer may be trained to output a set of values indicative of the likelihood of occurrence of each of the predetermined set of subword units 119. This set of values can be a vector and can indicate a probability distribution over the set of subword units. The output distribution of the decoder 231 and/or the softmax layer can include a posterior probability value for each of the different subword unit labels. Thus, if there are 4,096 different subword unit labels, the output $y_i$ of the decoder or the output of a softmax layer that receives and processes the output $y_i$ can include 4,096 different probability values, one for each output label. The probability distribution can then be used to select and assign scores to candidate subword units 119 in a beam search process for determining the transcription 120.

Figure 3:
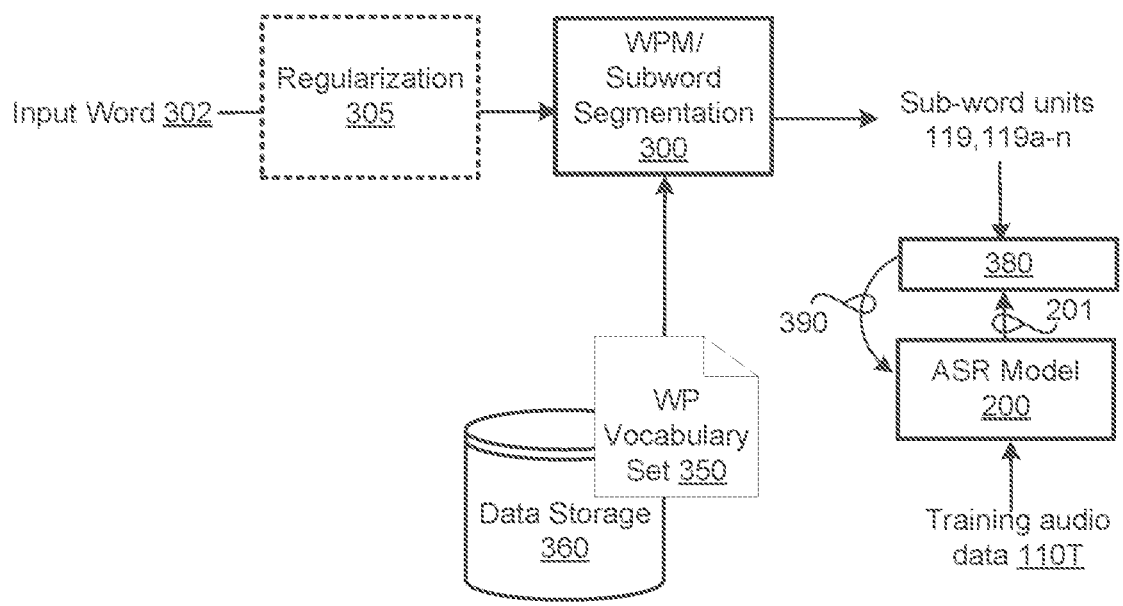
FIG. 3 is an example of a subword segmentation routine segmenting an input word into a plurality of subword segments.

FIG. 3 shows an example of the subword segmentation routine 300 (e.g., lightweight WPM) executing to segment an input word 302 into a plurality of subword units 119, 119a-b. During execution of the subword segmentation routine 300, the routine 300 access a trained vocabulary set 350 of subword units. In some examples, the trained vocabulary set 350 includes 4,096 different subword units including wordpieces, as well as graphemes and whole words. The trained vocabulary set 350 may be stored on data storage 360 of the remote system 60. During execution of the subword segmentation routine 300, the routine 300 selects the plurality of subword units 219 from the input word 302 by greedily finding a longest subword unit from the input word 302 that is present in the trained vocabulary set 350 until an end of the input word 302 is reached. That is, all processing performed by the routine 300 is performed strictly from left-to-right in order to sequentially find the longest subword at each position/index that is present in the trained vocabulary set 350. For example, when the input word 302 includes the word "Interspeech", the longest subword unit selected at the first position/index would be "Inter" followed by "sp", "ee", and "ch" reaching the end. FIG. 4 shows an example algorithm 400 representing the subword segmentation routine 300.

FIG. 3 also shows using the plurality of subword units 119, 119a-n as ground-truth subword units for training the ASR model 200. Here, a training example that includes audio data 110T characterizing an utterance of the input word 302 may be paired with ground-truth subword units 119. The ASR model 200 processes the training audio data 110 to generate, as output, a speech recognition result 201 for the utterance of the input word 302. Here, the speech recognition result 201 includes a sequence of hypothesized sub-word units, wherein each hypothesized subword unit in the sequence hypothesized subword units is output from the speech recognition model 200 at a corresponding output step. Thereafter, a loss function 380 (e.g., a cross-entropy loss or RNN-T loss) determines a supervised loss term 390 based on the sequence of hypothesized sub-word units and the plurality of subword units 119 selected from the input word by the subword segmentation routine 300. The supervised loss term 390 is used to update parameters of the ASR model 200 during training.

Figure 5:
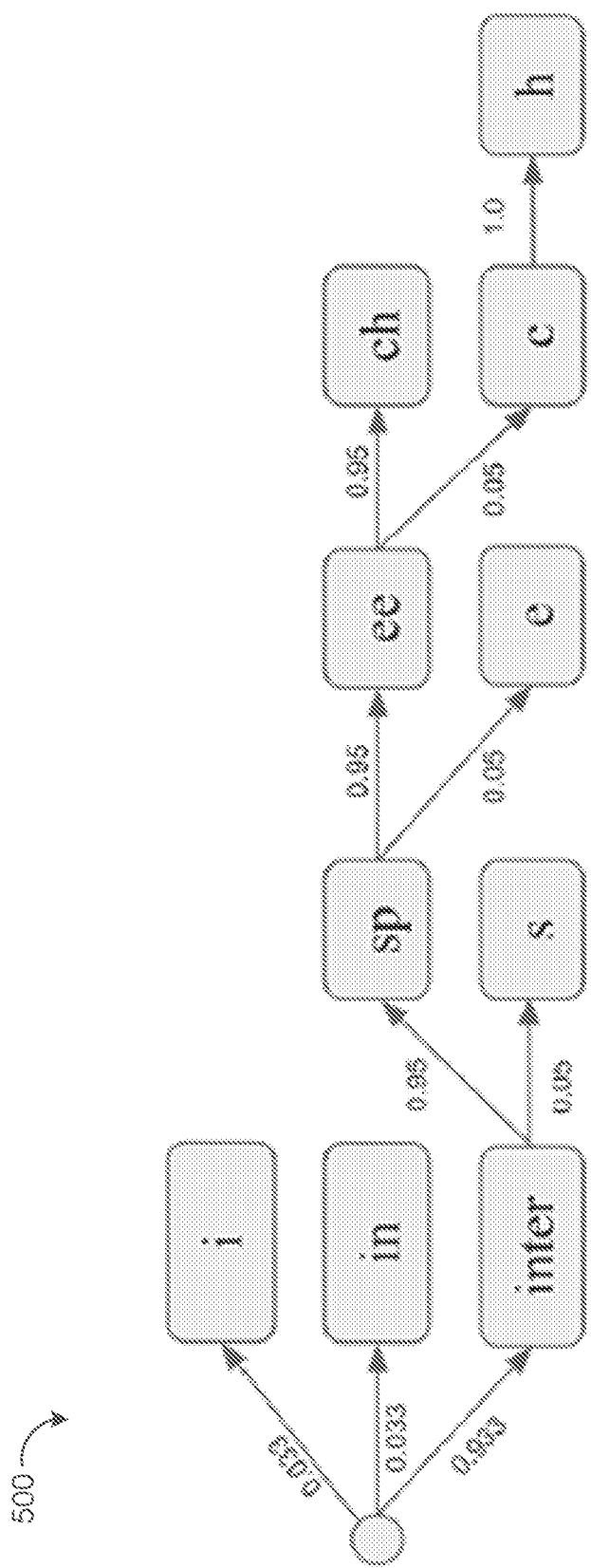
FIG. 5 is a schematic view of an example partial graph representing candidate subword units sampled from all possible subword units.

In some implementations, randomness is added to the subword unit selection step (e.g., line 4 of the algorithm 400 of FIG. 4) by sampling the selection of the subword unit at each index from all possible subword units instead of merely always selecting the longest subword unit at each index. That is, for each corresponding position (e.g., index) of a plurality different positions of the input word, the routine 300 may identify all possible candidate subword units from the input word 302 at the corresponding position that are present in the trained vocabulary set. Thereafter, for the corresponding position of the input word 302, the routine 300 may then randomly sample from all of the possible candidate subword units by assigning a 1−p probability to a longest one the possible candidate subword units and dividing a rest of the p probability evenly among all of the possible candidate subword units from the input word 302 at the corresponding position. Continuing with the above example where the input word 302 is "Interspeech", FIG. 5 shows a partial graph 500 of a training procedure for randomly sampling the selection of the subword unit at each position from all possible subword units. Here a regularization rate may be uniform and include a value of 0.1 such that a 0.9 probability is assigned for the longest candidate subword unit at each position, while the remaining 0.1 is evenly divided among all of the candidate subword units (including the longest candidate). Notably, at different positions, multiple subword unit candidates could be sampled that share the same prefix, thereby having the following two effects: a gold distribution of always selecting the longest subword unit is less sharp and therefore prevents overconfidence of the model, and the model becomes aware of prefix relations of the subword units.

Referring back to FIG. 3, in some implementations, one or more regularization techniques 305 are applied prior to execution of the subword segmentation routine 300 in order to introduce randomness into the routine 300 for improving further gains in speech recognition performance by the ASR model 200. In some examples, the regularization technique 305 includes creating a misspelling to the input word 302 by randomly deleting, using a pre-specified probability, a character from the input word independently. Applying the example above, the input word 302 "interspeech" would become "intrspeech" Notably, and with reference to the partial graph 500 of FIG. 5, since any letter in the input word could potentially be skipped/deleted to create the misspelling, then all of the subword unit candidates will still be present, albeit with different probability allocations. Additionally, by creating misspellings by deleting random characters, the routine 300 may learn additional relations between words beyond prefix structures by learning a corresponding suffix structure (and similarity of spelling in general). For example, if the gold label is "ing", and letter "i" is skipped, then the model will assign probability to the subword "ng", and thus learn the relation between "ing" and "ng". Furthermore, since multiple letters could be skipped, the gold label at any position could be from further into the future, enabling the routine 300 to learn better long-term dependencies in the data.

In additional examples, the regularization technique 305 applied prior to execution of the subword segmentation routine (e.g., lightweight WPM) 300 includes creating a misspelling of the input word 302 by pre-specifying a probability for swapping an order of adjacent character-pairs, and for each adjacent character-pair in the input word, swapping the order of the characters from the adjacent character-pair in the input word based on the pre-specified probability. Here, the order of any given character in the input word is limited to at most one swap. For instance, if the original word is "the", and we swap t and h to make it "hte", then an additional swap will not be performed on the pair "te" after the first swap. As a second example, an input word 302 of "center" could become "centre".

Figure 6:
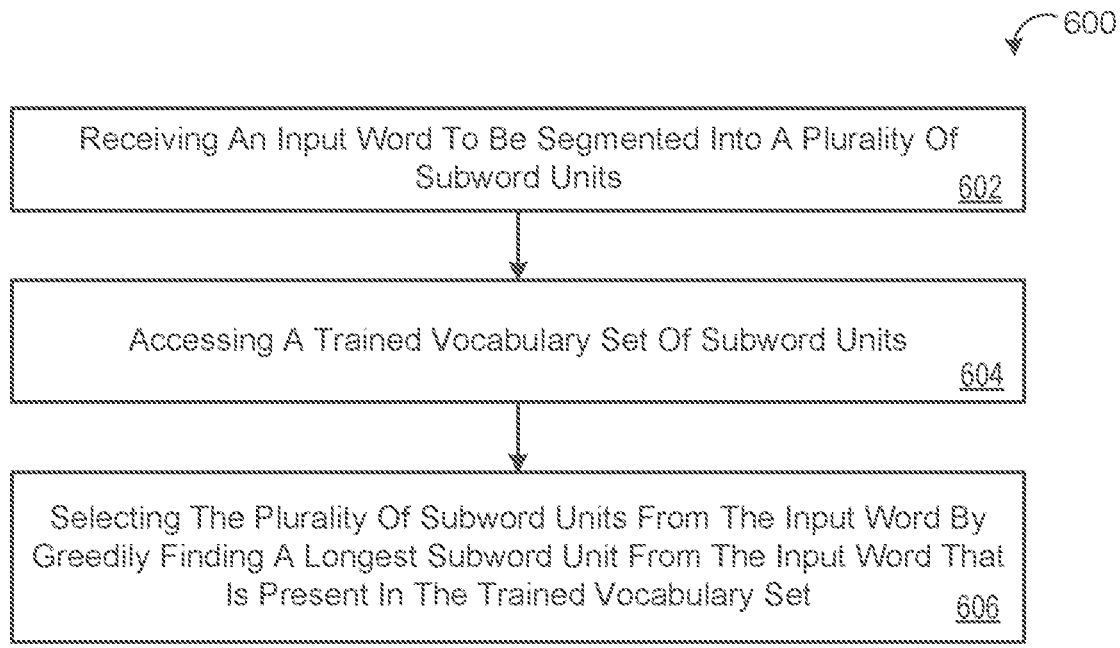
FIG. 6 is a flowchart of an example arrangement of operations for a computer-implemented method of segmenting subword units.

FIG. 6 shows an example arrangement of operations for a method 600 of subword unit segmentation for improving speech recognition. At operation 602, the method 600 includes receiving an input word 302 to be segmented into a plurality of subword units 119. Operations 604 and 606 are performed while executing a subword segmentation routine 300 to segment the input word 302 into the plurality of subword units 119. At operation 604, the method 600 includes accessing a trained vocabulary set 350 of subword units. At operation 606, the method 600 includes selecting the plurality of subword units 119 from the input word 302 by greedily finding a longest subword unit from the input word 302 that is present in the trained vocabulary set 350 until an end of the input word 302 is reached.

Figure 7:
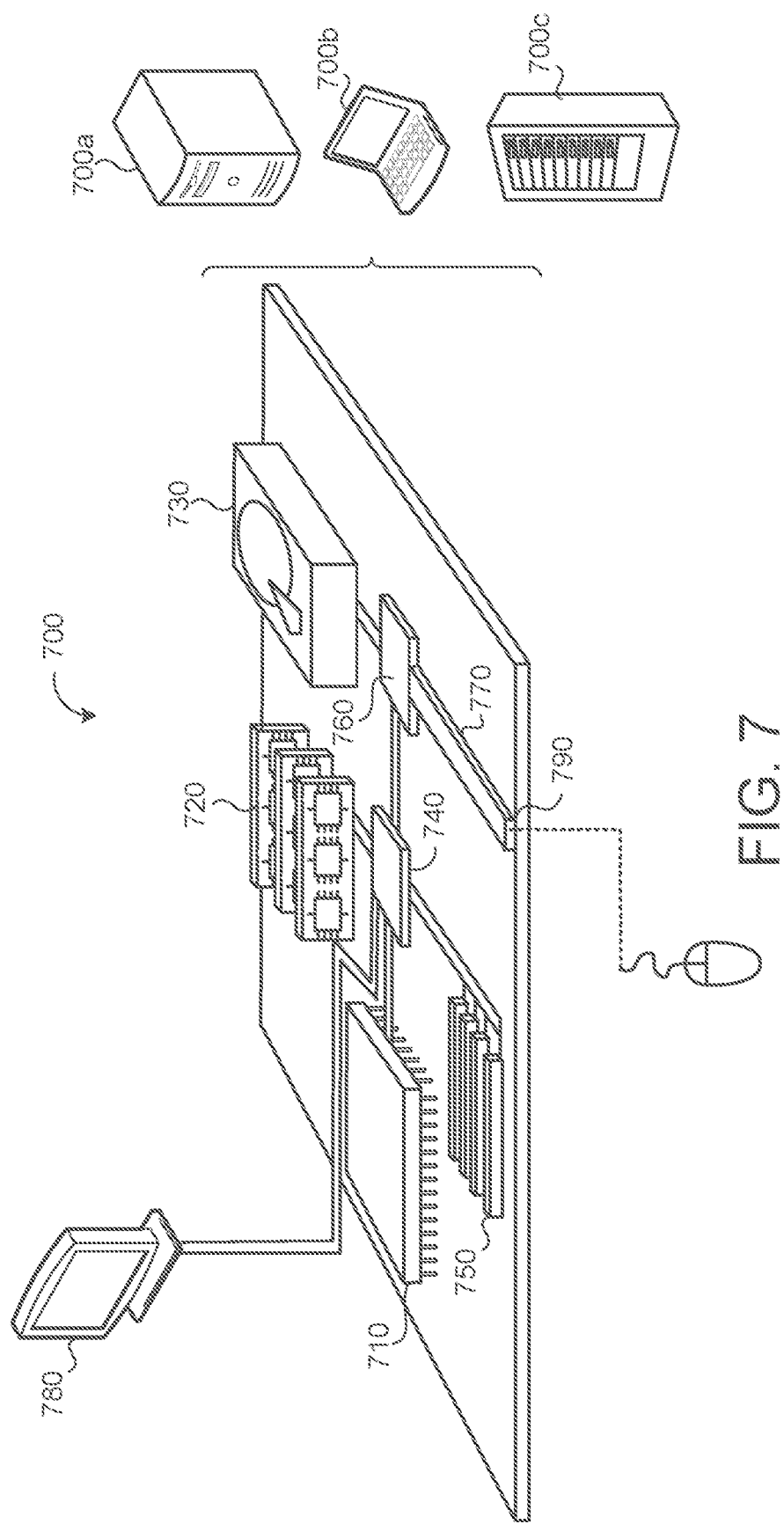
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 670, are interconnected using various busses, and may be mounted on a common motherboard or in other manners as appropriate. The processor (e.g., data processing hardware 710 of the remote server 60) 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory (e.g., memory hardware 720 of the remote server 60) 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving an input word to be segmented into a plurality of subword units; and
   executing a subword segmentation routine to segment the input word into a plurality of subword units by:
   accessing a trained vocabulary set of subword units; and
   selecting the plurality of subword units from the input word by greedily finding a longest subword unit from the input word that is present in the trained vocabulary set until an end of the input word is reached, wherein selecting the plurality of subword units comprises, for each corresponding position of a plurality different positions of the input word:
   identifying all possible candidate subword units from the input word at the corresponding position that are present in the trained vocabulary set; and
   randomly sampling from all of the possible candidate subword units by assigning a 1−p probability to a longest one the possible candidate subword units and dividing a rest of the p probability evenly among all of the possible candidate subword units from the input word at the corresponding position.

2. The method of claim 1, wherein the operations further comprise, prior to executing the subword segmentation model, creating a misspelling to the input word by randomly deleting, using a pre-specified probability, a character from the input word independently.

3. The method of claim 1, wherein the operations further comprise, prior to executing the subword segmentation model, creating a misspelling to the input word by:
pre-specifying a probability for swapping an order of adjacent character-pairs; and
for each adjacent character-pair in the input word, swapping the order of the characters from the adjacent character-pair in the input word based on the pre-specified probability.

4. The method of claim 3, wherein the order of any given character in the input word is limited to at most one swap.

5. The method of claim 1, wherein the operations further comprise:
receiving a training example comprising audio data characterizing an utterance of the input word;
processing the audio data to generate, for output by a speech recognition model, a speech recognition result for the utterance of the input word, the speech recognition result comprising a sequence of hypothesized subword units, each hypothesized subword unit in the sequence hypothesized subword units output from the speech recognition model at a corresponding output step;
determining a supervised loss term based on the sequence of hypothesized subword units and the plurality of subword units selected from the input word by the subword segmentation routine; and
updating parameters of the speech recognition model based on the supervised loss term.

6. The method of claim 5, wherein the speech recognition model comprises a Recurrent Neural Network-Transducer (RNN-T) model architecture, the RNN-T model architecture comprising an audio encoder, a prediction network, and a joint network.

7. The method of claim 6, wherein the audio encoder comprises a plurality of long-short term memory (LSTM) layers.

8. The method of claim 6, wherein the audio encoder comprises a plurality of transformer layers or conformer layers.

9. The method of claim 5, wherein the speech recognition model comprises a Listen, Attend, Spell (LAS) model architecture comprising an audio encoder, an attention mechanism, and a decoder.

10. A system comprising:
data processing hardware; and
memory hardware in communication with the data processing hardware and storing instructions that when executed on the data processing hardware causes the data processing hardware to perform operations comprising:
receiving an input word to be segmented into a plurality of subword units; and
executing a subword segmentation routine to segment the input word into a plurality of subword units by:
accessing a trained vocabulary set of subword units; and
selecting the plurality of subword units from the input word by greedily finding a longest subword unit from the input word that is present in the trained vocabulary set until an end of the input word is reached, wherein selecting the plurality of subword units comprises, for each corresponding position of a plurality different positions of the input word:
identifying all possible candidate subword units from the input word at the corresponding position that are present in the trained vocabulary set; and
randomly sampling from all of the possible candidate subword units by assigning a 1−p probability to a longest one the possible candidate subword units and dividing a rest of the p probability evenly among all of the possible candidate subword units from the input word at the corresponding position.

11. The system of claim 10, wherein the operations further comprise, prior to executing the subword segmentation model, creating a misspelling to the input word by randomly deleting, using a pre-specified probability, a character from the input word independently.

12. The system of claim 10, wherein the operations further comprise, prior to executing the subword segmentation model, creating a misspelling to the input word by:
pre-specifying a probability for swapping an order of adjacent character-pairs; and
for each adjacent character-pair in the input word, swapping the order of the characters from the adjacent character-pair in the input word based on the pre-specified probability.

13. The system of claim 12, wherein the order of any given character in the input word is limited to at most one swap.

14. The system of claim 10, wherein the operations further comprise:
receiving a training example comprising audio data characterizing an utterance of the input word;
processing the audio data to generate, for output by a speech recognition model, a speech recognition result for the utterance of the input word, the speech recognition result comprising a sequence of hypothesized subword units, each hypothesized subword unit in the sequence hypothesized subword units output from the speech recognition model at a corresponding output step;
determining a supervised loss term based on the sequence of hypothesized subword units and the plurality of subword units selected from the input word by the subword segmentation routine; and
updating parameters of the speech recognition model based on the supervised loss term.

15. The system of claim 14, wherein the speech recognition model comprises a Recurrent Neural Network-Transducer (RNN-T) model architecture, the RNN-T model architecture comprising an audio encoder, a prediction network, and a joint network.

16. The system of claim 15, wherein the audio encoder comprises a plurality of long-short term memory (LSTM) layers.

17. The system of claim 15, wherein the audio encoder comprises a plurality of transformer layers or conformer layers.

18. The system of claim 14, wherein the speech recognition model comprises a Listen, Attend, Spell (LAS) model architecture comprising an audio encoder, an attention mechanism, and a decoder.

* * * * *